US006060706A

United States Patent [19]

Nabeshima et al.

[11] Patent Number: 6,060,706

[45] Date of Patent: May 9, 2000

[54] ANALYTICAL APPARATUS USING ION TRAP MASS SPECTROMETER

[75] Inventors: Takayuki Nabeshima, Kokubunji; Yasuaki Takada, Kodaira; Minoru Sakairi, Tokorozawa, all of Japan

[73] Assignee: Hitachi, Ltd., Tokyo, Japan

[21] Appl. No.: 09/023,461

[22] Filed: Feb. 13, 1998

[30] Foreign Application Priority Data

Feb. 14, 1997 [JP] Japan .................................... 9-030027

[51] Int. Cl.[7] ............................ B01D 59/44; H01J 49/00

[52] U.S. Cl. ............................................ 250/288; 250/292

[58] Field of Search .................................... 250/281, 288, 250/289, 292

[56] References Cited

U.S. PATENT DOCUMENTS

| | | | |
|---|---|---|---|
| 5,028,777 | 7/1991 | Franzen et al. | 250/292 |
| 5,352,892 | 10/1994 | Mordehai et al. | 250/288 |
| 5,468,958 | 11/1995 | Franzen et al. | 250/292 |
| 5,481,107 | 1/1996 | Takada et al. | 250/281 |
| 5,514,868 | 5/1996 | Dixon | 250/288 |
| 5,559,337 | 9/1996 | Ito et al. | 250/288 |
| 5,652,427 | 7/1997 | Whitehouse et al. | 250/282 |
| 5,663,560 | 9/1997 | Sakairi et al. | 250/281 |
| 5,734,162 | 3/1998 | Dowell | 250/292 |
| 5,789,747 | 8/1998 | Kato et al. | 250/292 |

*Primary Examiner*—Bruce C. Anderson
*Attorney, Agent, or Firm*—Beall Law Offices

[57] ABSTRACT

In an analytical apparatus, an ion trap mass spectrometer and a detector for detecting ions separated in the mass spectrometer are installed in different chambers. Ions generated from an ion source and passing through two differential pumping chambers into a third chamber containing the detector are deflected from their initial trajectory into the mass spectrometer in a fourth chamber for separation. In a first embodiment, the separated ions are returned along the same path into the detector in the third chamber. According to a second embodiment, the detector is located along the path of ion travel beyond the mass spectrometer, and the separated ions pass through a second orifice in the mass spectrometer and into the detector in the third chamber.

36 Claims, 5 Drawing Sheets

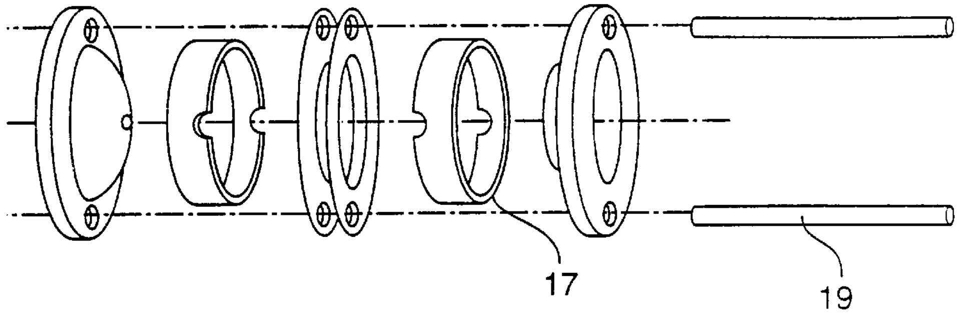
FIG. 2(a)
FIG. 2(b)
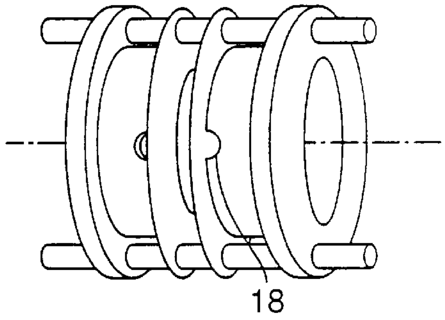
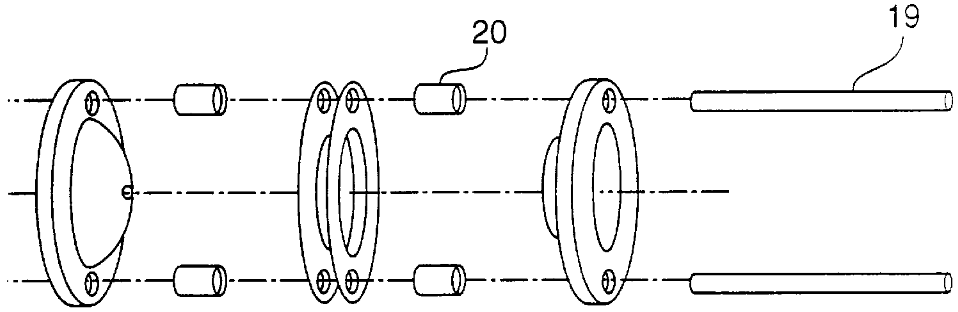
FIG. 2(c)
FIG. 2(d)
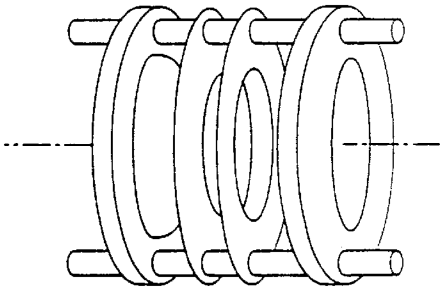

ANALYTICAL APPARATUS USING ION TRAP MASS SPECTROMETER

BACKGROUND OF THE INVENTION

1. Field of the Invention

The present invention relates generally to separation analysis of a sample, and more particularly to an analytical apparatus that uses an ion-trap mass spectrometer.

2. Description of the Related Art

A typical ion trap mass spectrometer employs a pair of opposing bowl-like end cap electrodes and toroidal ring electrodes between the end cap electrodes. Quartz rings, for example, are used between the electrodes as spacers for maintaining predetermined intervals between the electrodes. A plurality of small openings (about 3 mm in diameter) are bored in the spacers, through which a buffer gas is introduced and through which the mass spectrometer can be evacuated.

The buffer gas is an indispensable gas introduced to converge the trajectories of the ions injected into the ion trap mass spectrometer. The pressure of the buffer gas in the spectrometer is kept at approximately $10^{-3}$–$10^{-4}$ torr to optimize the efficiency of ion convergence. A pump is used to control the pressure in a high-vacuum chamber containing the mass spectrometer and the size of the openings in the spacers.

A detector and an ion focusing lens are also provided in the high-vacuum region in the spectrometer. The high-vacuum region prevents electrical discharge at the detector due to the high voltage applied to the detector.

Periodically, the ion trap mass spectrometer requires inspection and maintenance, including decontamination, which is performed by exposing the mass spectrometer to atmospheric pressure. Following the inspection and maintenance, approximately 10–12 hours are required to evacuate the mass spectrometer through the small openings in the spacers, to reach the target pressure of approximately $10^{-3}$ to $10^{-4}$ torr. The openings cannot be enlarged more than the noted diameter because the buffer gas pressure must be kept at a level at which the efficiency of convergence is optimized.

Mordehai et al, "A Novel Differentially Pumped Design for Atmospheric Pressure Ionization-ion trap Mass Spectrometry" (*Rapid Communications in Mass Spectrometry,* Vol. 7, 205–209 (1993)) describes an apparatus that provides the detector in a separate chamber at a succeeding stage of a differential pumping area, to effect the internal evacuation by a different pump. By this design, the evacuation time following inspection and maintenance is to be reduced, because the ionization is performed at atmospheric pressure.

SUMMARY OF THE INVENTION

In the ion trap mass spectrometer described above, the orifices through which the ions enter the high-vacuum region and the entrance opening through which the ions are introduced into the mass spectrometer are arranged in a straight line, such that particles other than the ions to be analyzed (including droplets flowing from the orifices or photons generated by the ion source) are permitted to directly enter the mass spectrometer. Thus, the sensitivity of the mass spectrometer cannot be easily adjusted since the convergent effect of the ions is not precisely controlled. Furthermore, noise increases because the mass spectrometer becomes easily contaminated. The present invention solves these and other problems of the prior art through a novel ion trap mass spectrometer design that requires less time until restart of measurement after exposure of the mass spectrometer to atmospheric pressure, and by preventing particles other than the analyzed ions from directly entering the mass spectrometer.

In a preferred embodiment of the present invention, the ion trap mass spectrometer and detector are installed in different chambers, and ions generated from an ion source pass through a first differential pumping chamber, a second differential pumping chamber, and a third pumping chamber maintained at a high vacuum. The detector and a deflector are positioned in the third chamber. A fourth chamber contains the ion trap mass spectrometer. After the ions pass through the first through third chambers and are deflected into the fourth chamber, the ions are subjected to mass separation and then drawn back into the third chamber and detected by the detector.

The pressure in the fourth chamber is maintained in a range from approximately $10^{-3}$ to $10^{-4}$ torr, the operating pressure range of the ion trap mass spectrometer. If necessary, a buffer gas, such as argon, nitrogen, or helium, may be fed to the fourth room. No spacers, such as the quartz rings of the typical mass spectrometer, are required, so that the mass spectrometer can have an open configuration, instead of being self-contained. Consequently, when the inside of the mass spectrometer is exposed to atmospheric pressure, the internal evacuation can be readily effected to permit restart of measurement after only a short time. Further, the detector, being contained in the third chamber, does not give rise to an electrical discharge.

By using a deflector to deflect and converge ions passing through the otherwise out-of-line orifices into the ion entrance opening of the mass spectrometer, particles, including droplets and photons, other than the ions to be analyzed are prevented from directly entering the mass spectrometer. Therefore, the convergent effect of the ions within the mass spectrometer is precisely controllable, and noise is reduced by suppressing the contamination of the mass spectrometer.

BRIEF DESCRIPTION OF THE DRAWINGS

FIGS. 2(*a*) and 2(*b*) illustrate the construction of a closed-type mass spectrometer;

FIGS. 2(*c*) and 2(*d*) illustrate a construction of an open-type mass spectrometer;

DETAILED DESCRIPTION OF THE PREFERRED EMBODIMENTS

The embodiments described below with respect to the accompanying figures relate to an analytical apparatus that uses an ion trap mass spectrometer for use in conducting mass spectrometric analysis by ionizing a very small amount of a sample in a liquid under atmospheric pressure using an ion source, and introducing the sample into a vacuum. By featuring the saving of time until restart of measurement after inspection and maintenance of the apparatus, including decontamination of the mass spectrometer, and the prevention of contamination of the mass spectrometer and increase in noise in the measured results, the present invention is suitable for any chemical analytical apparatus intended for the analysis of a very small amount of a substance.

Figure 1:
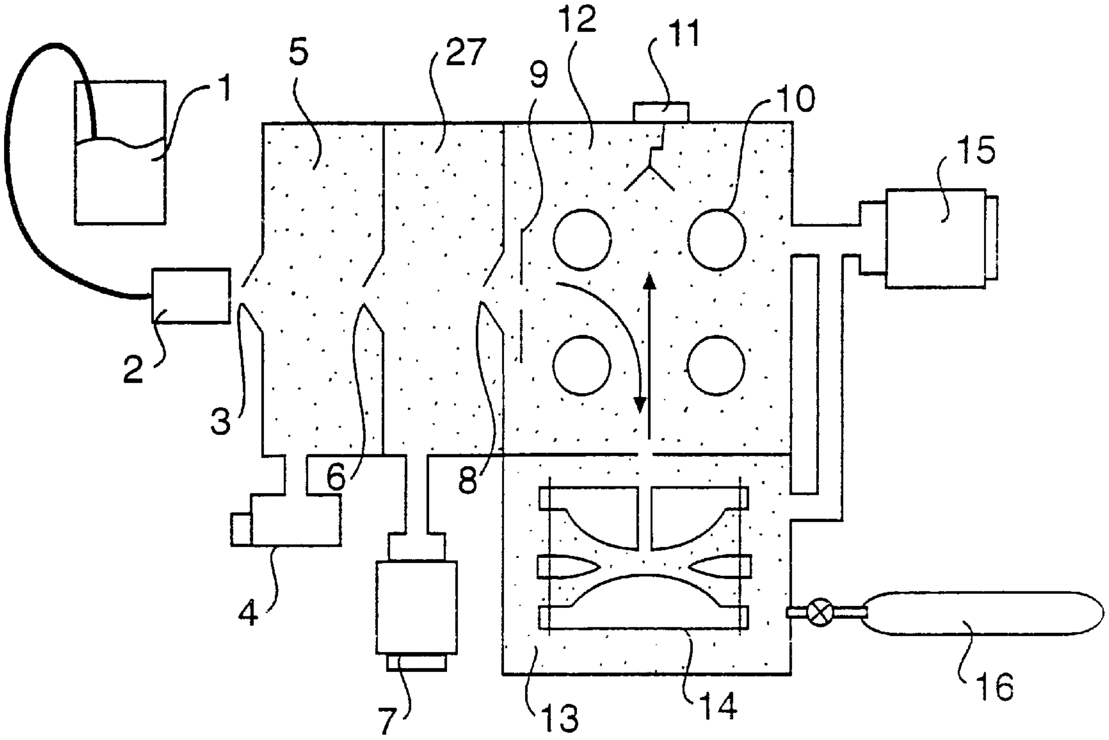
FIG. 1 schematically illustrates an analytical apparatus employing an ion trap mass spectrometer according to the teachings of the present invention.

A first embodiment of the inventive apparatus will be described with initial reference to FIG. 1. A solution 1 containing a sample is sent to an ion source 2 before being ionized at atmospheric pressure. The ion source may be a plasma source, a liquid chromatography source, or an atmospheric pressure ion source (APIS). The ions thus generated are introduced through an orifice 3 into a first differential pumping chamber 5 that is evacuated by a rotary pump 4 to approximately 1 torr, for example. The ions are then passed through an orifice 6 into a second differential pumping chamber 27 that is evacuated by a turbo molecular pump 7 to approximately $10^{-2}$ to $10^{-3}$ or $10^{-3}$ to $10^{-4}$ torr. The ions are then introduced through an orifice 8 into a third pumping chamber 12 of high vacuum, where a gate electrode 9 controls the passage of the ions into a zone controlled by a deflector 10. In this embodiment, a detector 11 is disposed within the third chamber 12.

A voltage appropriately applied to the deflector 10 adjusts the path of the ions so that they deflect substantially at a right angle through an entrance opening 113 into a fourth chamber 13, in which is disposed an ion trap mass spectrometer 14. The entrance opening 113 is set to a diameter suitably small for maintaining the different respective pressures in the third and fourth chambers. Since particles other than the ions are unaffected by the deflector 10, only the ions are introduced into the fourth chamber 13, and the remaining particles continue in a straight path.

The third chamber 12 and the fourth chamber 13 are preferably internally evacuated, for example by a turbo moleular pump 15, to approximately $10^{-5}$ to $10^{-6}$ torr and $10^{-3}$ to $10^{-4}$ torr, respectively. The pressure difference depends upon the magnitude of conductance. The pressure in the third chamber can be as low as practical, considering the cost of the pump, for example.

A buffer gas 16 may be introduced into the fourth room 13 from an external source. Any suitable buffer gas may be used, including argon, nitrogen, or helium. A suitable buffer gas is one which has low reactivity to the ions. A low-mass buffer gas should be used for low-mass ions, and a high-mass buffer gas should be used for high-mass ions.

In the mass spectrometer in the fourth chamber 13, the ions are subjected to mass separation and then removed back into the third chamber 12 through the same entrance opening through which they initially passed. At this time, the voltage applied to the deflector 10 is changed so that the ions move straight from the fourth chamber 13 through the zone of deflection into the detector 11. The voltage on the gate electrode 9 is also reversed from that at the time of entry of the ions into the third chamber 12 from the second chamber 27, so as to prevent the trajectories of the ions from intersecting each other.

FIGS. 2(*a*) and 2(*b*) schematically illustrate an example of a closed-type ion trap mass spectrometer 14, and FIGS. 2(*c*) and 2(*d*) schematically illustrate an example of an open-type ion trap mass spectrometer. Other configurations may be used, including a rodless construction in which the electrodes are supported by the walls of a suitable apparatus. In FIGS. 2(*a*) and 2(*b*), spacers 17 are provided with openings 18 for the introduction of buffer gas and the evacuation of the interior of the mass spectrometer. In this embodiment, insulating rods 19 are used to line up and maintain the position of the electrodes of the ion trap mass spectrometer. The electrode-to-electrode intervals are fixed by directly fitting the spacers 17. In the open-type mass spectrometer, however, the electrode-to-electrode intervals are fixed by fitting the insulating rods 19 into respective spacers 20, as shown. The ion trap mass spectrometer 14 of the invention can be either the closed-type or open-type, but the open-type affords certain advantages in the construction and maintenance of the mass spectrometer.

Figure 3A:
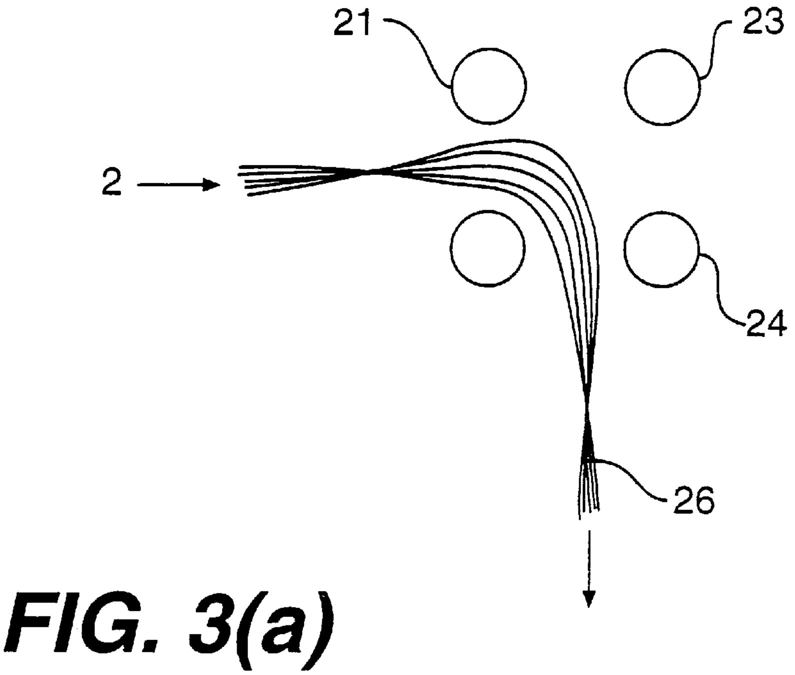
FIGS. 3(*a*) and 3(*b*) illustrate the passage of ions through a deflector toward the mass spectrometer and returning from the mass spectrometer, respectively.
Figure 3B:
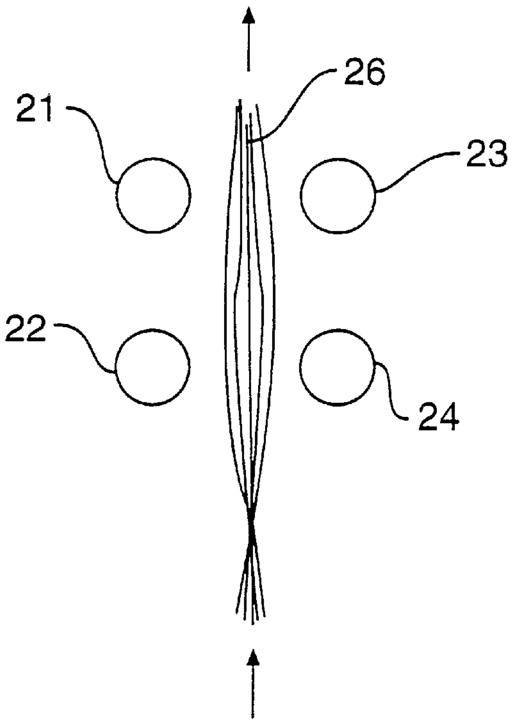

FIG. 3(*a*) illustrates the change in the trajectory of the ions when passing through the deflector 10. The deflector 10, as illustrated, is of the so-called Q deflector type, composed of four electrodes 20, 21, 22, and 23. By regulating the voltages applied to the electrodes 20–23 as shown in FIG. 3(*a*) by way of example, the ions can be deflected 90 degrees from their initial path into a new trajectory which introduces them into the ion trap mass spectrometer 14 in the fourth chamber 13. After being separated in the mass spectrometer, the ions pass back into the third chamber 12 as described above, and pass directly through the deflector 10 into the detector 13, the deflector electrodes 20–23 now having a different voltage application to permit the ions to travel in the desired path, as shown in FIG. 3(*b*) by way of example.

Figure 4:
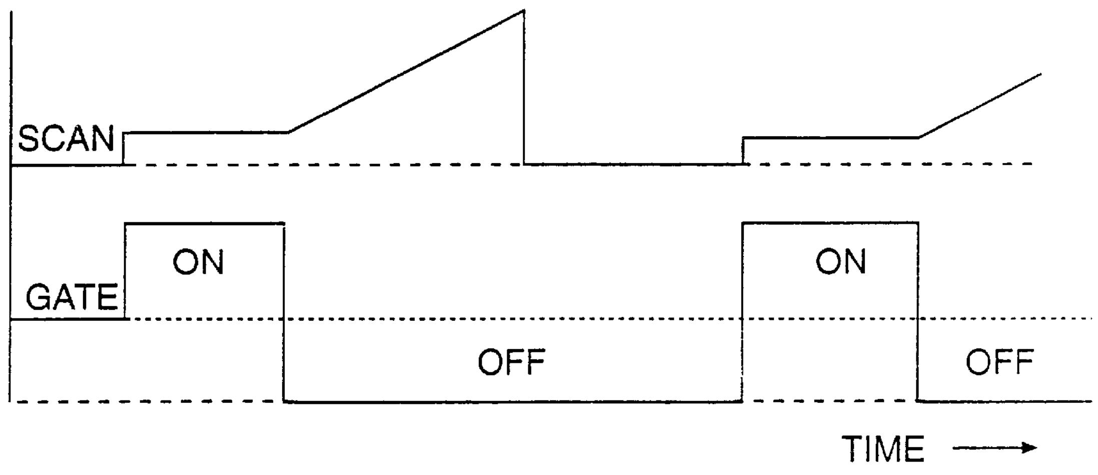
FIG. 4 shows the timing relationship between the ion scan in the mass spectrometer and the condition of the gate electrode.

FIG. 4 shows a timing chart according to which the voltage applied to the gate electrode 9 and the scanning of the ions in the mass spectrometer 14 are related. While the ions are passed through the first and second chambers and introduced into the chamber room 12, a voltage (e.g., −100V) for drawing the ions from the second chamber into the third chamber is applied to the gate electrode 9. The gate electrode is said to be in the ON state at this time. After the ions are separated in the ion trap mass spectrometer and then removed back into the third chamber, the voltage on the gate electrode 9 is reversed (to +100V, for example) so as to maintain the ions on the path to the detector 11. In this state, during which the detector performs its detection scan, the gate electrode 9 is said to be OFF.

Figure 5:
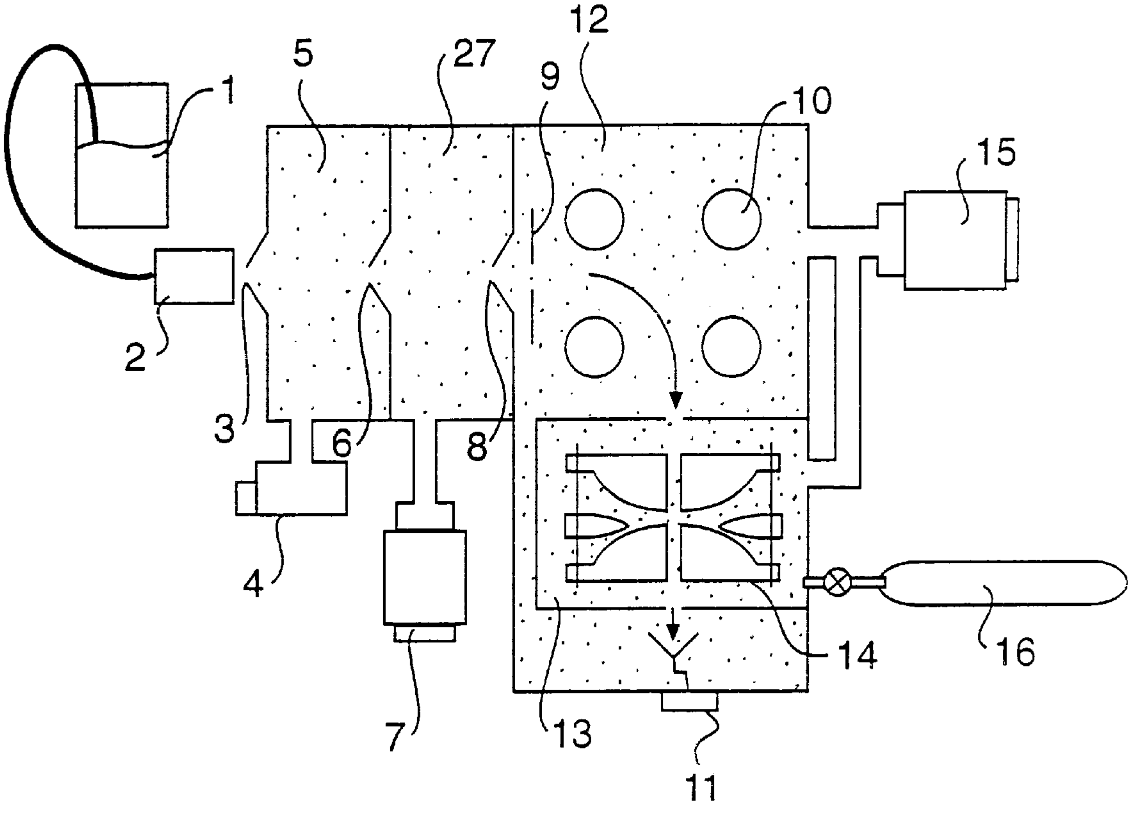
FIG. 5 shows an analytical apparatus employing an ion trap mass spectrometer according to a second embodiment of the invention.

A second embodiment of the invention will described next, with reference to FIG. 5. The construction shown in FIG. 5 is identical to that shown in FIG. 1, except that the detector 11 is relocated to a position in the third chamber 12 beyond the mass spectrometer 14 with respect to the path of ion travel. Thus, in this embodiment, the fourth chamber 13 is located within the third chamber 12, and contains a second opening 213 through which the ions pass after being separated in the mass spectrometer 14. The detector 11 is in the region of high vacuum, as in the first embodiment, but the direction of travel of the ions is not reversed in this second embodiment.

According to either of the first and second embodiments described above, the ion trap mass spectrometer constructed according to the present invention can be evacuated even after having been exposed to atmospheric pressure, and measurement can be restarted within a shorter period of time than that required for the prior art measurement to be restarted. Furthermore, particles other than the ions to be analyzed, including droplets forming at the orifices or photons generated by the ion source, are prevented from directly entering the ion trap mass spectrometer, so as to make it possible to precisely control the convergent effect of ions inside the mass spectrometer, thus suppressing the contamination of the mass spectrometer and reducing noise.

Various modifications of the embodiments described above will become apparent to those of ordinary skill in the art upon reading and studying the description. All such modifications that basically rely upon the teachings through which the present invention has advanced the state of the art are properly considered within the spirit and scope of the invention.

We claim:

1. An analytical apparatus, comprising:

an ion source;

a first exhausting chamber arranged to receive ions generated by the ion source through a first orifice between the ion source and the first exhausting chamber;

a second exhausting chamber arranged to receive the ions from the first exhausting chamber through a second orifice between the first and second exhausting chambers;

a third exhausting chamber arranged to receive the ions from the second exhausting chamber through a third orifice between the second and third exhausting chambers;

an ion deflector in the third exhausting chamber and arranged to receive the ions from the third orifice and to deflect the received ions;

a fourth exhausting chamber arranged to receive the ions from the deflector in the third exhausting chamber through a fourth orifice between the third and fourth exhausting chambers; and an open-space ion trap mass spectrometer in the fourth exhausting chamber;

wherein the open-space ion trap mass spectrometer includes first and second end cap electrodes, the first end cap electrode having a first opening through which the ions are received to be trapped between the first and second end cap electrodes, a ring electrode disposed between the first and second end cap electrodes, and a support between the first and second end cap electrodes for supporting the first and second end cap electrodes and the ring electrode in an open-space assembly.

2. An analytical apparatus as claimed in claim 1, further comprising a detector in the third exhausting chamber.

3. An analytical apparatus as claimed in claim 2, further comprising a gate electrode in the third exhausting chamber, and means for controlling the gate electrode to pass the ions through the gate electrode from the third orifice to the deflector, and for controlling the gate electrode to block all ion passage through the gate electrode when the ions are passing through the deflector to the detector after passing through the fourth orifice.

4. An analytical apparatus as claimed in claim 3, further comprising means for controlling the deflector to deflect the ions received from the third orifice by substantially a right angle toward the fourth orifice, and for controlling the deflector not to deflect the ions passing from the fourth orifice to the detector.

5. An analytical apparatus as claimed in claim 4, wherein the ion source is a plasma ion source.

6. An analytical apparatus as claimed in claim 2, further comprising means for controlling the deflector to deflect the ions received from the third orifice by substantially a right angle toward the fourth orifice, and for controlling the deflector not to deflect the ions passing from the fourth orifice to the detector.

7. An analytical apparatus as claimed in claim 2, wherein the third exhausting chamber has a total internal pressure that is lower than that of the fourth exhausting chamber.

8. An analytical apparatus as claimed in claim 7, wherein the total internal pressure in the third exhausting chamber is less than or equal to $10^{-5}$ torr.

9. An analytical apparatus as claimed in claim 8, further comprising a gate electrode in the third exhausting chamber, and means for controlling the gate electrode to pass the ions through the gate electrode from the third orifice to the deflector, and for controlling the gate electrode to block all ion passage through the gate electrode when the ions are passing through the deflector to the detector after passing through the fourth orifice.

10. An analytical apparatus as claimed in claim 9, further comprising means for controlling the deflector to deflect the ions received from the third orifice by substantially a right angle toward the fourth orifice, and for controlling the deflector not to deflect the ions passing from the fourth orifice to the detector.

11. An analytical apparatus as claimed in claim 10, wherein the ion source is a plasma ion source.

12. An analytical apparatus as claimed in claim 8, wherein the total internal pressure in the third exhausting chamber is between $10^{-5}$ and $10^{-6}$ torr.

13. An analytical apparatus as claimed in claim 8, further comprising means for controlling the deflector to deflect the ions received from the third orifice by substantially a right angle toward the fourth orifice, and for controlling the deflector not to deflect the ions passing from the fourth orifice to the detector.

14. An analytical apparatus as claimed in claim 7, further comprising a gate electrode in the third exhausting chamber, and means for controlling the gate electrode to pass the ions through the gate electrode from the third orifice to the deflector, and for controlling the gate electrode to block all ion passage through the gate electrode when the ions are passing through the deflector to the detector after passing through the fourth orifice.

15. An analytical apparatus as claimed in claim 14, further comprising means for controlling the deflector to deflect the ions received from the third orifice by substantially a right angle toward the fourth orifice, and for controlling the deflector not to deflect the ions passing from the fourth orifice to the detector.

16. An analytical apparatus as claimed in claim 7, further comprising means for controlling the deflector to deflect the ions received from the third orifice by substantially a right angle toward the fourth orifice, and for controlling the deflector not to deflect the ions passing from the fourth orifice to the detector.

17. An analytical apparatus as claimed in claim 2, wherein the second end cap has a second opening through which the ions pass to the detector after being trapped between the first and second end cap electrodes, and wherein the fourth orifice, the first and second openings, and the detector are disposed in a substantially straight line.

18. An analytical apparatus as claimed in claim 2, wherein the deflector is disposed between the detector and the fourth orifice.

19. An analytical apparatus as claimed in claim 1, wherein the first exhausting chamber has a total internal pressure that is higher than that of the second exhausting chamber, the second exhausting chamber has a total internal pressure that is higher than that of the third exhausting chamber; and the third exhausting chamber has a total internal pressure that is lower than that of the fourth exhausting chamber.

20. An analytical apparatus as claimed in claim 19, further comprising means for controlling the deflector to deflect the ions received from the third orifice by substantially a right angle toward the fourth orifice, and for controlling the deflector not to deflect the ions passing from the fourth orifice to the detector.

21. An analytical apparatus as claimed in claim 20, further comprising a gate electrode in the third exhausting chamber, and means for controlling the gate electrode to pass the ions through the gate electrode from the third orifice to the deflector, and for controlling the gate electrode to block all ion passage through the gate electrode when the ions are passing through the deflector to the detector after passing through the fourth orifice.

22. An analytical apparatus as claimed in claim 1, wherein the support includes a plurality of rods connecting the first and second end cap electrodes and the ring electrode together.

23. An analytical apparatus as claimed in claim 1, wherein the ion source is a plasma ion source.

24. An ion trap mass spectrometer, comprising:

first and second end cap electrodes; and a ring electrode arranged between the first and second end cap electrode;

wherein the first end cap electrode has a common opening through which ions are both introduced to be trapped and extracted after being trapped.

25. An open-space ion trap mass spectrometer, comprising:

first and second end cap electrodes;

a ring electrode arranged between the first and second end cap electrodes; and support between the first and second end cap electrodes for supporting the first and second end cap electrodes and the ring electrode in an open-space assembly;

wherein the first end cap electrode has a common opening through which ions are both introduced to be trapped and extracted after being trapped.

26. An analytical apparatus, comprising:

an ion source;

a first exhausting region including an ion detector; and a second exhausting region including an ion trap mass spectrometer;

wherein the first exhausting region is positioned to receive ions emitted from the ion source before the ions enter the ion trap mass spectrometer.

27. An analytical apparatus as claimed in claim 26, wherein the first exhausting region has a total internal pressure that is lower than that of the second exhausting region.

28. An analytical apparatus, comprising:

an ion source;

a first exhausting region including an ion detector;

a second exhausting region including an open-space ion trap mass spectrometer;

wherein the open-space ion trap mass spectrometer includes first and second end cap electrodes, the first end cap electrode having an opening through which ions are introduced to be trapped between the first and second end cap electrodes, a ring electrode arranged between the first and second end cap electrodes, and support between the first and second end cap electrodes for supporting the first and second end cap electrodes and the ring electrode in an open-space assembly; and wherein the first exhausting region is positioned to receive ions emitted from the ion source before the ions enter the ion trap mass spectrometer.

29. An analytical apparatus as claimed in claim 28, wherein the first exhausting region has a total internal pressure that is lower than that of the second exhausting region.

30. An analytical apparatus, comprising:

an ion source;

a first exhausting region arranged to introduce ions generated by the ion source from an atmospheric pressure region through a first orifice of a first barrier that divides the atmospheric pressure region and the first exhausting region;

a second exhausting region arranged to introduce the ions from the first exhausting region through a second orifice of a second barrier that divides the first exhausting region and the second exhausting region;

a third exhausting region arranged to introduce the ions from the second exhausting region through a third orifice of a third barrier that divides the second exhausting region and the third exhausting region;

an ion detector in the third exhausting region;

a fourth exhausting region arranged to introduce the ions from the third exhausting region through a fourth orifice of a fourth barrier that divides the third exhausting region and the fourth exhausting region; and an ion trap mass spectrometer in the fourth exhausting region.

31. An analytical apparatus, comprising:

an ion source;

a first exhausting region arranged to introduce ions generated by the ion source from an atmospheric pressure region through a first orifice of a first barrier that divides the atmospheric pressure region and the first exhausting region;

a second exhausting region arranged to introduce the ions from the first exhausting region through a second orifice of a second barrier that divides the first exhausting region and the second exhausting region;

a third exhausting region arranged to introduce the ions from the second exhausting region through a third orifice of a third barrier that divides the second exhausting region and the third exhausting region;

a fourth exhausting region arranged to introduce the ions from the third exhausting region through a fourth orifice of a fourth barrier that divides the third exhausting region and the fourth exhausting region; and an open-space ion trap mass spectrometer in the fourth exhausting region;

wherein the open-space ion trap mass spectrometer includes first and second end cap electrodes, the first end cap electrode having an opening through which the ions are introduced to be trapped between the first and second end cap electrodes, and support between the first and second end cap electrodes for supporting the first and second end cap electrodes and the ring electrode in an open-space assembly.

32. An analytical apparatus, comprising:

an ion source;

a first exhausting region arranged to introduce ions generated by the ion source from an atmospheric pressure region through a first orifice of a first barrier that divides the atmospheric pressure region and the first exhausting region;

a second exhausting region arranged to introduce the ions from the first exhausting region through a second orifice of a second barrier that divides the first exhausting region and the second exhausting region;

a third exhausting region arranged to introduce the ions from the second exhausting region through a third orifice of a third barrier that divides the second exhausting region and the third exhausting region;

a fourth exhausting region arranged to introduce the ions from the third exhausting region through a fourth orifice of a fourth barrier that divides the third exhausting region and the fourth exhausting region;

wherein the first exhausting region has a total internal pressure that is higher than that of the second exhausting region, the second exhausting region has a total internal pressure that is higher than that of the third exhausting region, the third exhausting region has a total internal pressure that is lower than that of the fourth exhausting region, and the fourth exhausting region has a total internal pressure that is lower than that of the first exhausting region; and an ion trap mass spectrometer in the fourth exhausting region.

33. An analytical apparatus, comprising:

an ion source;

a first exhausting region arranged to introduce ions generated by the ion source from an atmospheric pressure region through a first orifice of a first barrier that divides the atmospheric pressure region and the first exhausting region;

a second exhausting region arranged to introduce the ions from the first exhausting region through a second orifice of a second barrier that divides the first exhausting region and the second exhausting region;

a third exhausting region arranged to introduce the ions from the second exhausting region through a third orifice of a third barrier that divides the second exhausting region and the third exhausting region;

a fourth exhausting region arranged to introduce the ions from the third exhausting region through a fourth orifice of a fourth barrier that divides the third exhausting region and the fourth exhausting region;

wherein the first exhausting region has a total internal pressure that is higher than that of the second exhausting region, the second exhausting region has a total internal pressure that is higher than that of the third exhausting region, the third exhausting region has a total internal pressure that is lower than that of the fourth exhausting region, and the fourth exhausting region has a total internal pressure that is lower than that of the first exhausting region; and an open-space ion trap mass spectrometer in the fourth exhausting region;

wherein the open-space ion trap mass spectrometer includes first and second end cap electrodes, the first end cap electrode having an opening through which the ions are introduced to be trapped between the first and second end cap electrodes, a ring electrode arranged between the first and second end cap electrodes, and support between the first and second end cap electrodes for supporting the first and second end cap electrodes and the ring electrode in an open-space assembly.

34. An analytical apparatus, comprising:

an ion source;

a first exhausting region arranged to introduce ions generated by the ion source from an atmospheric pressure region through a first orifice of a first barrier that divides the atmospheric pressure region and the first exhausting region;

a second exhausting region arranged to introduce the ions from the first exhausting region through a second orifice of a second barrier that divides the first exhausting region and the second exhausting region;

a third exhausting region arranged to introduce the ions from the second exhausting region through a third orifice of a third barrier that divides the second exhausting region and the third exhausting region;

an ion detector in the third exhausting region; and an ion trap mass spectrometer as a fourth exhausting region, and arranged to introduce the ions from the third exhausting region through an opening into the ion trap mass spectrometer.

35. An analytical apparatus, comprising:

an ion source;

a first exhausting region arranged to introduce ions generated by the ion source from an atmospheric pressure region through a first orifice of a first barrier that divides the atmospheric pressure region and the first exhausting region;

a second exhausting region arranged to introduce the ions from the first exhausting region through a second orifice of a second barrier that divides the first exhausting region and the second exhausting region;

a third exhausting region arranged to introduce the ions from the second exhausting region through a third orifice of a third barrier that divides the second exhausting region and the third exhausting region;

an ion detector in the third exhausting region; and a fourth exhausting region arranged to introduce the ions from the third exhausting region through a fourth orifice of a fourth barrier that divides the third exhausting region and the fourth exhausting region; said fourth exhausting region housing first and second ion trap mass spectrometer end cap electrodes, and an ion trap mass spectrometer ring electrode arranged between the first and second ion trap mass spectrometer end cap electrodes.

36. An analytical apparatus, comprising:

an ion source; and at least two exhausting chambers provided in communication with each other so as to permit ions produced by the ion source to pass through the exhausting chambers in sequence;

wherein an ion trap mass spectrometer and an ion detector are respectively installed in a different one of the exhausting chambers.

* * * * *